US008000180B2

(12) United States Patent
Kawakami

(10) Patent No.: US 8,000,180 B2
(45) Date of Patent: Aug. 16, 2011

(54) MEDIUM TRANSPORTING MECHANISM AND MEDIUM PROCESSING APPARATUS HAVING THE SAME

(75) Inventor: Hideki Kawakami, Hata-machi (JP)

(73) Assignee: Seiko Epson Corporation, Tokyo (JP)

(*) Notice: Subject to any disclaimer, the term of this patent is extended or adjusted under 35 U.S.C. 154(b) by 365 days.

(21) Appl. No.: 12/355,213

(22) Filed: Jan. 16, 2009

(65) Prior Publication Data
US 2009/0185461 A1 Jul. 23, 2009

(30) Foreign Application Priority Data
Jan. 17, 2008 (JP) ................................ 2008-008349

(51) Int. Cl.
*G11B 21/08* (2006.01)

(52) U.S. Cl. ................ 369/30.34; 369/30.03; 369/30.06
(58) Field of Classification Search ............... 369/30.34, 369/30.03, 30.12, 30.24, 30.06, 30.33, 30.31, 369/30.32, 30.36, 30.55, 30.42
See application file for complete search history.

(56) References Cited

U.S. PATENT DOCUMENTS
7,885,148 B2 * 2/2011 Ikeda .......................... 369/30.34
2007/0280057 A1 12/2007 Ikeda FOREIGN PATENT DOCUMENTS
JP 10-199128 7/1998
JP 2005-122789 5/2005
JP 2006-202379 8/2006
* cited by examiner

*Primary Examiner* — Ali Neyzari
(74) *Attorney, Agent, or Firm* — Nutter McClennen & Fish LLP; John J. Penny, Jr.

(57) ABSTRACT

A medium transporting mechanism for transporting one of stacked media each of which has a hole is provided. A holder is provided on a movable transporting arm and holds the one of the media. A guide is provided in the transporting arm, the guide has a tapered surface that is inclined with respect to an axis of the guide. The tapered surface is configured to be brought into contact with an inner surface of the hole of the one of the media when the guide is inserted into the hole of the one of the media. The tapered surface includes a first surface on a tip end portion of the guide and a second surface on a base end portion of the guide. An inclined angle of the first surface with respect to the axis of the guide is greater than an inclined angle of the second surface with respect to the axis of the guide.

11 Claims, 14 Drawing Sheets

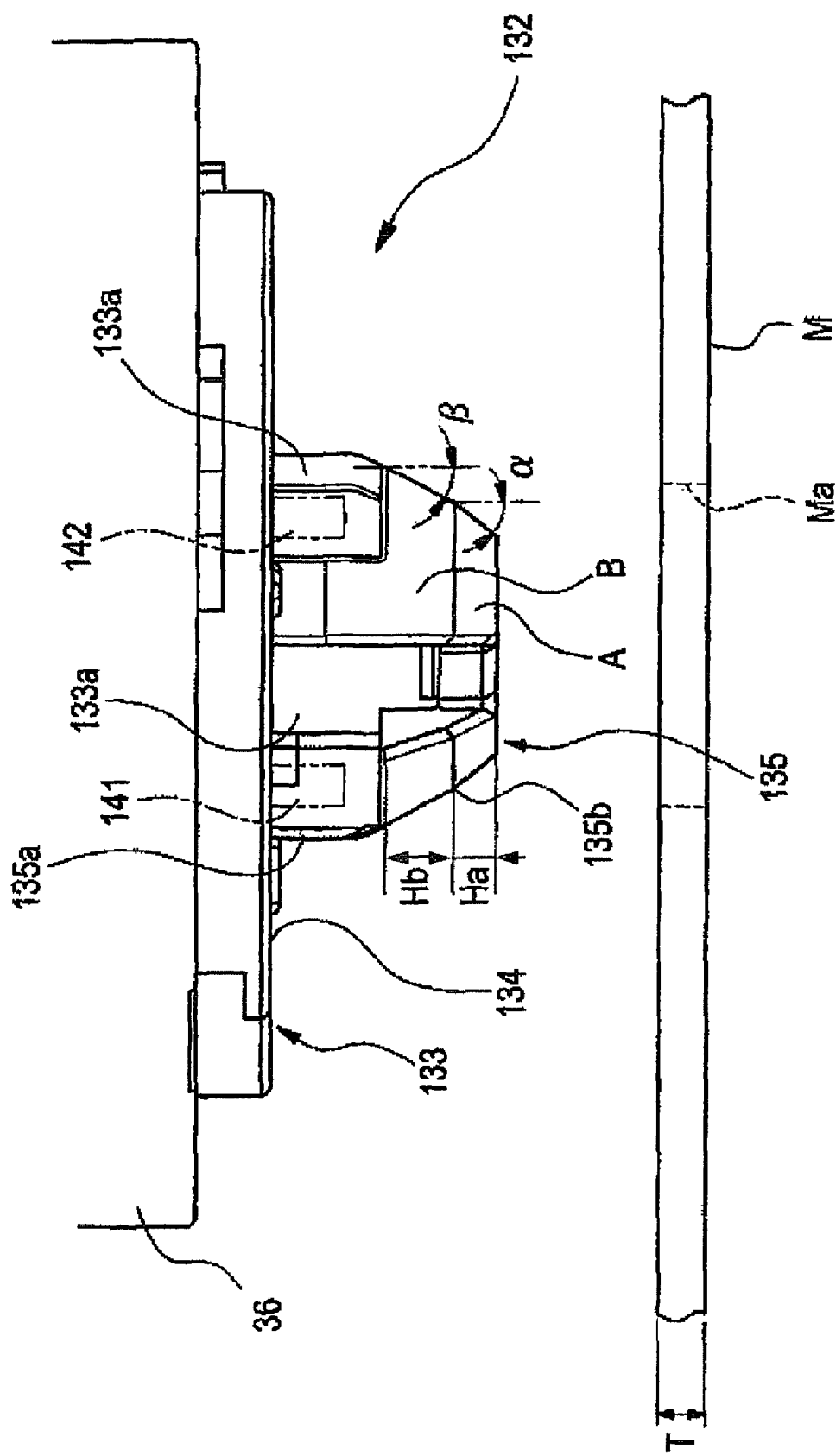

MEDIUM TRANSPORTING MECHANISM AND MEDIUM PROCESSING APPARATUS HAVING THE SAME

Priority is claimed to Japanese Patent Application No. 2008-008349 filed Jan. 17, 2008, the disclosure of which, including the specification, drawings and claims, is incorporated herein by reference in its entirety.

BACKGROUND

The present invention relates to a medium transporting mechanism capable of transporting disc-shaped media such as CDs or DVDs and a medium processing apparatus equipped with the medium transporting mechanism.

In recent years, a medium processing apparatus such as a disc duplication apparatus has been used to write data in media such as blank CDs or DVDs or a CD/DVD publisher has been used to write data and performs label printing to prepare and issue media.

As such a medium processing apparatus, for example, there is a known disc processing apparatus equipped with a disc holding mechanism that holds and transports a disc for a processor to write data perform printing on the disc (for example, see Japanese Patent Publication No. 2006-202379 A).

Before processing such as writing data, the discs are accommodated in a stacker in a stacked manner. In this case, since the discs stacked in this manner are accommodated randomly in the stacker, the center location of each disc is readily deviated from the center of each disc picked up by a disc holding mechanism.

For that reason, the disc processing apparatus is provided with a guide, which includes a movable head having a tapered portion gradually narrows toward a tip end thereof, and the guide is inserted into the central holes of discs to align the discs.

Here, a large force is required to move the guide, as the guide is brought into contact with the central holes of the second and subsequent discs, because a load is increased in the discs other than the uppermost disc due to a frictional force or a contact force between upper and lower discs.

In this case, when the inclined angle of the tapered portion with respect to the axis of the guide is made small, a variation of the diameter of the guide with respect to a downward movement amount of the disc holding mechanism is decreased. Therefore, even when the guide is brought into contact with a plurality of discs subsequent to the second disc, the discs are able to be moved with a large force.

However, when the inclined angle of the tapered portion with respect to the axis of the guide is made small, a protrusion size of the guide is increased, thereby reduces the mobility of the disc holding mechanism or increases in the size of the disc processing apparatus.

SUMMARY

It is therefore an object of at least one embodiment of the invention to provide a medium transporting mechanism capable of suppressing an increase in the size thereof, achieving good mobility, and positioning stacked media easily and smoothly, and to provide a medium processing apparatus equipped with the medium transporting mechanism.

According to an aspect of at least one embodiment of the invention, there is provided a medium transporting mechanism for transporting one of stacked media each of which has a hole, the medium transporting mechanism comprising: a movable transporting arm; a holder that is provided in the transporting arm and holds the one of the media; and a guide that is provided in the transporting arm and has a tapered surface, which is inclined with respect to an axis of the guide, wherein the tapered surface is configured to be brought into contact with an inner surface of the hole of the one of the media when the guide is inserted into the hole of the one of the media so that a center of the one of the media is positioned at the axis of the guide; wherein the tapered surface includes a first surface at a tip end side of the guide and a second surface at a base end side of the guide; and wherein an inclined angle of the first surface with respect to the axis of the guide is greater than an inclined angle of the second surface with respect to the axis of the guide.

According to the media transporting mechanism having the above-described configuration, each medium is able to be considerably moved in a planar direction by the first surface having the greater inclined angle with respect to the axis of the guide and then each medium is able to be exactly aligned in the planar direction by the second surface having a smaller inclined angle with respect to the axis of the guide. In this way, it is possible to position the media satisfactorily, while minimizing protrusion of the guide.

That is, it is possible to minimize an increase in the size of the medium transporting mechanism, achieve good mobility, and position the stacked media easily and smoothly.

A dimension of the first surface in a direction parallel to the axis of the guide may be equal to or smaller than a thickness of the one of the stacked media.

According to this configuration, each medium is able to be smoothly positioned, since the maximum number of media brought into contact with the first surface, where a load for moving each medium increases, is set to one.

A dimension of the second surface in a direction parallel to the axis of the guide may be equal to or smaller than a thickness of two of the stacked media.

According to this configuration, each medium is able to be smoothly positioned, since the maximum number of media in contact with the second surface, where a load for moving each medium increases, is set to two.

The holder may be configured to be brought into contact with the inner surface of the hole to hold the one of the media.

The holder may include a plurality of holding member that are disposed around the axis of the guide.

The guide may be formed into a circular truncated cone shape of which a diameter gradually narrows from the base end toward the tip end thereof.

The guide may be formed into a circular cone shape of which a diameter gradually narrows from the base end to the tip end thereof.

The medium transporting mechanism may further comprise a stacker that accommodates the media in a stacked manner.

The guide may be inserted into the hole of the one of the media when the transporting arm is moved down.

According to another aspect of at least one embodiment of the present invention, a medium processing apparatus comprising: a processor that is operable to at least one of read data from, write data on, and execute printing on the medium; and the above-described medium transporting apparatus that transports the one of the stacked media to the processor.

According to the media processing apparatus having the above configuration, it is possible to provide the medium processing apparatus with high processing reliability, since the media processing apparatus includes the medium transporting mechanism capable of surely positioning and holding each medium.

BRIEF DESCRIPTION OF THE DRAWINGS

The advantages of the present invention and exemplary embodiments therefor are described in detail with reference to the accompanying drawings, wherein:

FIG. 9 is a side view illustrating the part of the transporting arm;

DETAILED DESCRIPTION OF THE EMBODIMENTS

Hereinafter, a medium transporting mechanism and a medium processing apparatus equipped with the medium transporting mechanism according to an embodiment of the invention will be described with reference to the accompanying drawings.

Figure 1:
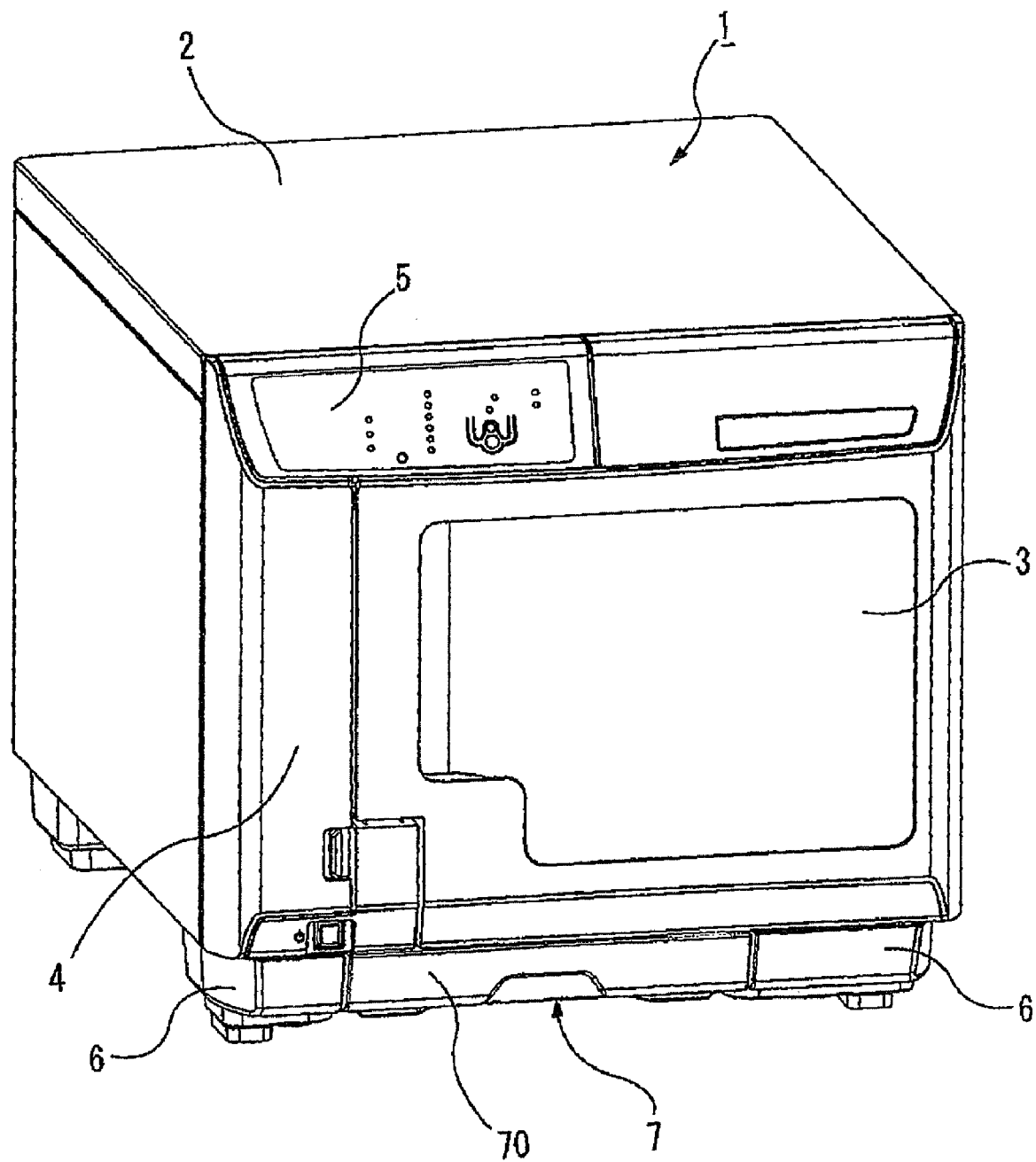
FIG. 1 is a perspective view illustrating an outer appearance of a publisher (a media processing apparatus) according to at least one embodiment of the invention.

As shown in FIG. 1, a publisher 1 is a media processing apparatus that writes data on circular plate-shaped media such as CDs or DVDs or performs printing on a label surface of the media and includes a substantially rectangular parallelepiped case 2. Openable door 3 and 4 capable of being opened and closed right and left are disposed on a front surface of the case 2. An operation surface 5 provided with displays, operation buttons, and the like is formed on an upper left end of the case 2. On a lower end of the case 2, leg portions 6 protruding downward are provided on right and left sides. A drawing mechanism 7 is provided between the right and left leg portions 6.

Figure 2:
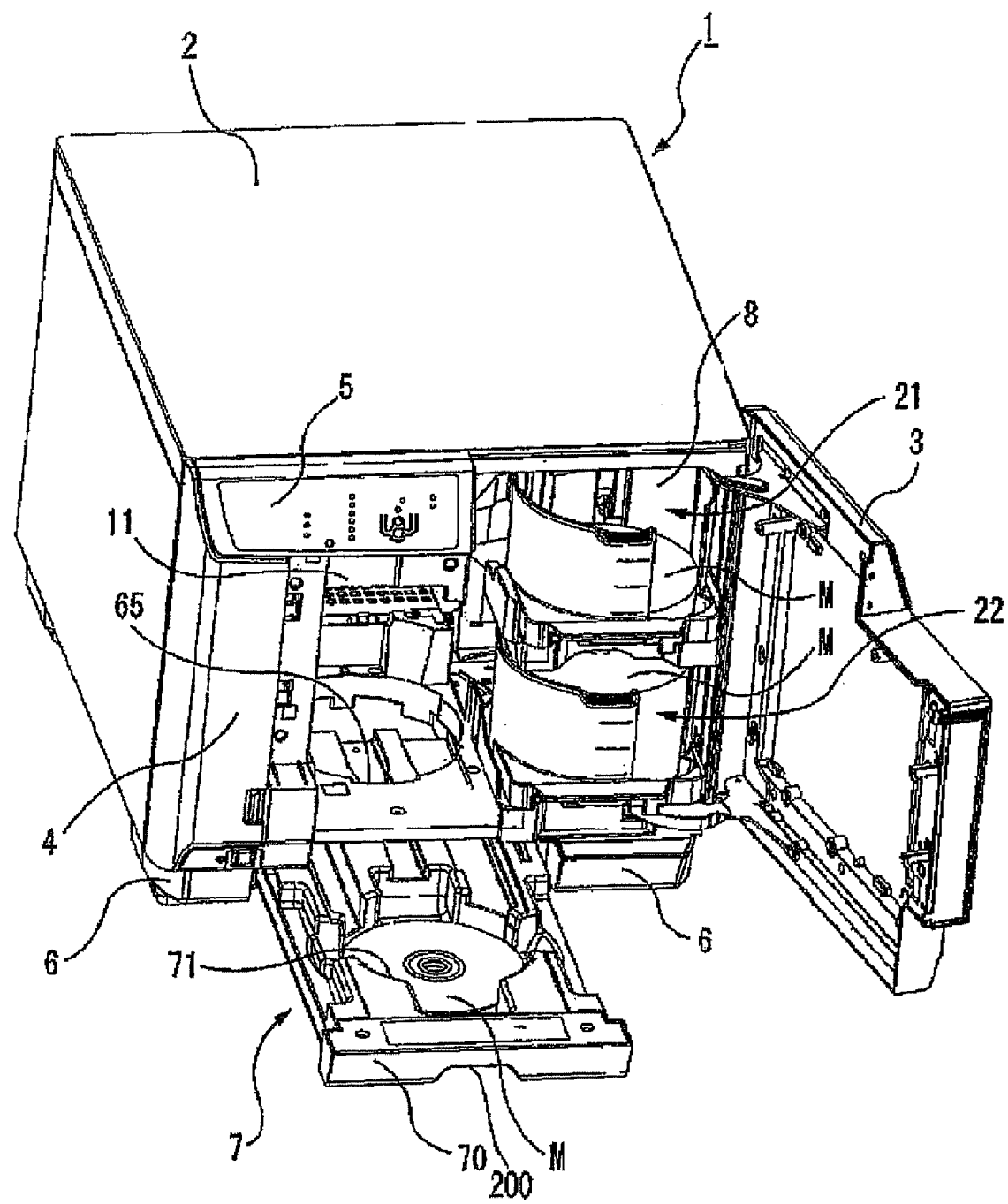
FIG. 2 is a perspective view illustrating the publisher in view of a front side in a state where a case of the publisher is removed.

As shown in FIG. 2, the openable door 3 that is disposed on the right side in view of the front side opens and closes an opening 8 on the front side of the publisher 1. The openable door 3 is a door that is opened and closed when unprocessed media M are set through the opening 8 or processed media M are taken out through the opening 8, for example.

In addition, the openable door 4 that is disposed on the left side in view of the front side is opened and closed when ink cartridges 12 of a label printer 11 (shown in FIG. 3) are replaced. When the openable door 4 is opened, a cartridge mounting unit 14 having plural cartridge holders 13 arranged in a vertical direction is exposed.

Inside the case 2 of the publisher 1, a media stacker 21 as a media storage unit capable of stacking plural sheets (for example, 50 sheets) of unprocessed media M, which are not subjected to data writing, and a media stacker 22 as a media storage unit capable of stacking plural sheets (for example, 50 sheets) of unprocessed media M or processed media M are disposed vertically so that central axis of the stored media M are the same. The media stacker 21 and the media stacker 22 are detachably mounted at predetermined locations, respectively.

The upper media stacker 21, which includes a pair of right and left arc frame plate 24 and 25, receives the media M from an upper side and concentrically stacks the media M. A process of stacking or supplementing media M in the media stacker 21 can be simply carried out by opening the openable door 3 and taking out the media stacker 21.

The lower media stacker 22 has the same configuration as the upper media stacker 21. That is, the lower media stacker 22, which includes a pair of right and left arc frame plate 27 and 28, receives the media M from the upper side and concentrically stacks the media M.

A medium transporting mechanism 31 is disposed on a rear side of the media stackers 21 and 22. The medium transporting mechanism 31 includes a vertical guide shaft 35 extending vertically between a main body frame 30 and a top plate 33 of a chassis 32. A transporting arm 36 is supported by the vertical guide shaft 35 so as to move up and down and rotate. The transporting arm 36 is driven by a driving moter 37 to move up and down along the vertical guide shaft 35 and driven by a driving motor 10 to rotate right and left about the vertical guide shaft 35 (see FIG. 5 and described below).

On a rear of a side portion of the upper media stacker 21, the lower media stacker 22, and the medium transporting mechanism 31, two media drives 41 stacked vertically are disposed. In addition, a carriage 62 of the label printer 11, which is described below, is movably disposed on a lower side of the media drives 41.

The media drives 41 are each provided with a media tray 41a that advances and retreats between a location where data are written on the media M and a location where the media M are received and the media M are granted and received.

The label printer 11 includes a media tray 45 capable of moving between a printing location where label printing is performed on a label surface of the media M and the location where the media M is received and the media M are granted and received.

Figure 3:
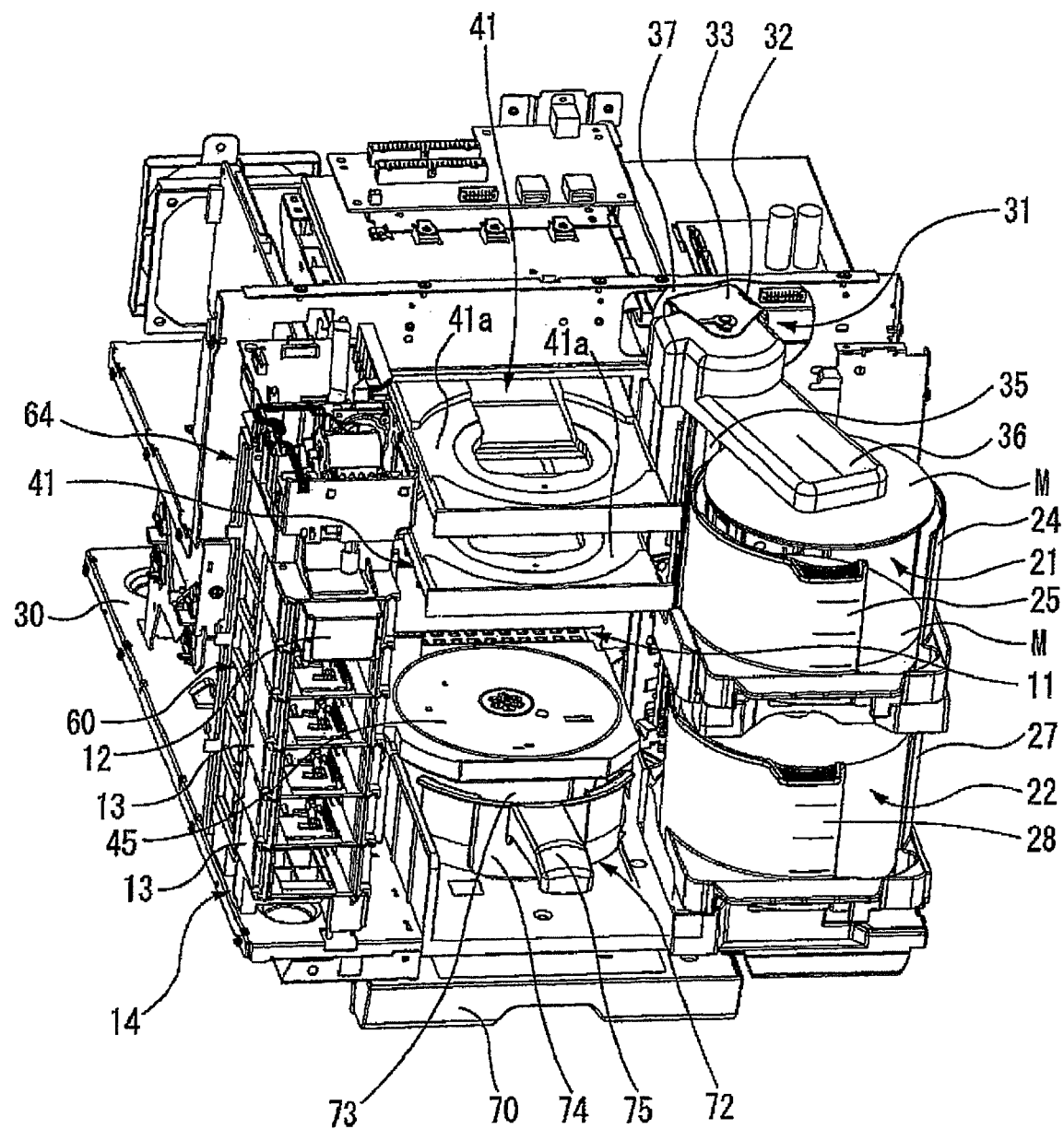
FIG. 3 is a perspective view illustrating the publisher in view from a rear side in a state where a case of the publisher is removed.

FIG. 3 shows that the media trays 41a of the upper and lower media drives 41 are drawn forward to be positioned at the location where the media are granted and received and the media tray 45 of the lower label printer 11 is positioned at the location where the media are granted and received. In addition, the label printer 11 is an ink-jet printer and uses the ink cartridges 12 of respective colors (six colors of black, cyan, magenta, yellow, light cyan, and light magenta in this embodiment) as an ink supply mechanism 60. The ink cartridges 12 are mounted on respective cartridge holders 13 of the cartridge mounting unit 14 from a front side.

Here, spaces where the transporting arm 36 of the medium transporting mechanism 31 moves up and down are formed between the pair of right and left frame plates 24 and 25 of the media stacker 21 and between the pair of right and left frame plates 27 and 28 of the media stacker 22. In addition, a space where the transporting arm 36 of the medium transporting mechanism 31 rotates horizontally and is positioned directly above the media stacker 22 is formed between the upper media stacker 21 and the lower media stacker 22. In addition, when both the media trays 41a enter the media drives 41, the transporting arm 36 of the medium transporting mechanism 31 moved down to gain access to the media tray 45 positioned at the location where the media are granted and received.

The transporting arm 36 of the medium transporting mechanism 31 is capable of moving down lower than the height location of the media tray 45 in a state where both the media trays 41a are positioned at the location where data are written and the media tray 45 is positioned at the inward printing location. In addition, below the location of the media tray 45 where the media are granted and received, a guide hole 65 in which a media stacker (separate stacker) described below is formed as a guide hole for passing the media M, which are released by the transporting arm 36 moving down, up to the location.

The drawing mechanism 7 includes a drawing tray 70 capable of drawing and opening the media from the main body frame 30 or receiving and closing the media in a lower portion of the main body frame 30. In the drawing tray 70, a stacker unit 71 is formed in a concave shape in a downward direction. When the drawing tray 70 is positioned at a receiving location (close location), the stacker unit 71 is positioned below the guide hole 65 and the center of the stacker unit 71 is positioned so that central axes of both the media tray 41a and the media tray 45 at the location where the media are granted and received are the same. The stacker unit 71 receives the media M inserted through the guide hole 65 and receives a relatively small number (for example, 5 sheets to 10 sheets) of the media M. The stacker unit 71 receives the media M from the upper side to concentrically stack the media M.

In addition, when the media M received in the stacker unit 71 is drawn out, an operator hangs a lock portion 200 (see FIG. 2) formed in a front surface of the drawing tray 70 with fingers to draw the drawing tray 70 from the main body frame 30.

In the stacker unit 71 of the drawing tray 70 that is in a received state and the guide hole 65, a media stacker (separate stacker) 72 capable of receiving more media M than the stacker unit 71 is detachably mounted (see FIG. 3). The media stacker 72 which also includes a pair of arc frame plates 73 and 74 receives the media M from the upper side and is configure to receive plural sheets (for example, 50 sheets) of media M so as to concentrically stack the media M. A space where the transporting arm 36 of the medium transporting mechanism 31 moves up and down is formed between a pair of the arc frame plates 73 and 74. In addition, a grip 75 for a user to attach and detach the stacker is provided above the frame plate 74.

In a state where the media stacker 72 is attached, the unprocessed media M are taken out from the upper media stacker 21 to allow the media drive 41 and the label printer 11 to perform data recording and printing, and then the media M can be received in the media stacker 72.

For example, the maximum number (50 sheets+50 sheets) of the unprocessed media M are loaded in the upper media stacker 21 and the lower media stacker 22, and all the sheets (50 sheets) of the media M loaded in the lower media stacker 22 are processed in succession to be received in the media stacker 72. Next, all the sheets (50 sheets) of the media M loaded in the upper media stacker 21 are processed in succession to be received in the vacant lower media stacker 22. In this way, the maximum number (50 sheets+50 sheets) of the media M loaded in the upper media stacker 21 and the lower media stacker 22 are processed at one time (batch processing mode).

In a state where the media stacker 72 is separated, the unprocessed media M are taken out from the upper media stacker 21 or the lower media stacker 22 to allow the media drive 41 and the label printer 11 to perform data recording and printing, and then the media M can be received in the stacker unit 71 of the drawing tray 70 in the received state.

With such a configuration, the processed media M can be taken out from the stacker unit 71 by drawing the drawing tray 70. That is, even while the media M are processed, one sheet or plural sheets of the processed media M can be sequentially taken out with the openable door 3 closed (outside discharge mode).

Here, by combination operations of upward movement, downward movement, right rotation, and left rotation of the transporting arm 36, the media M are appropriately transported among the media stacker 21, the media stacker 22, the stacker unit 71 (or the media stacker 72) of the drawing tray 70, the media tray 41a of each media drive 41, and the media tray 45 of the label printer 11.

Figure 4:
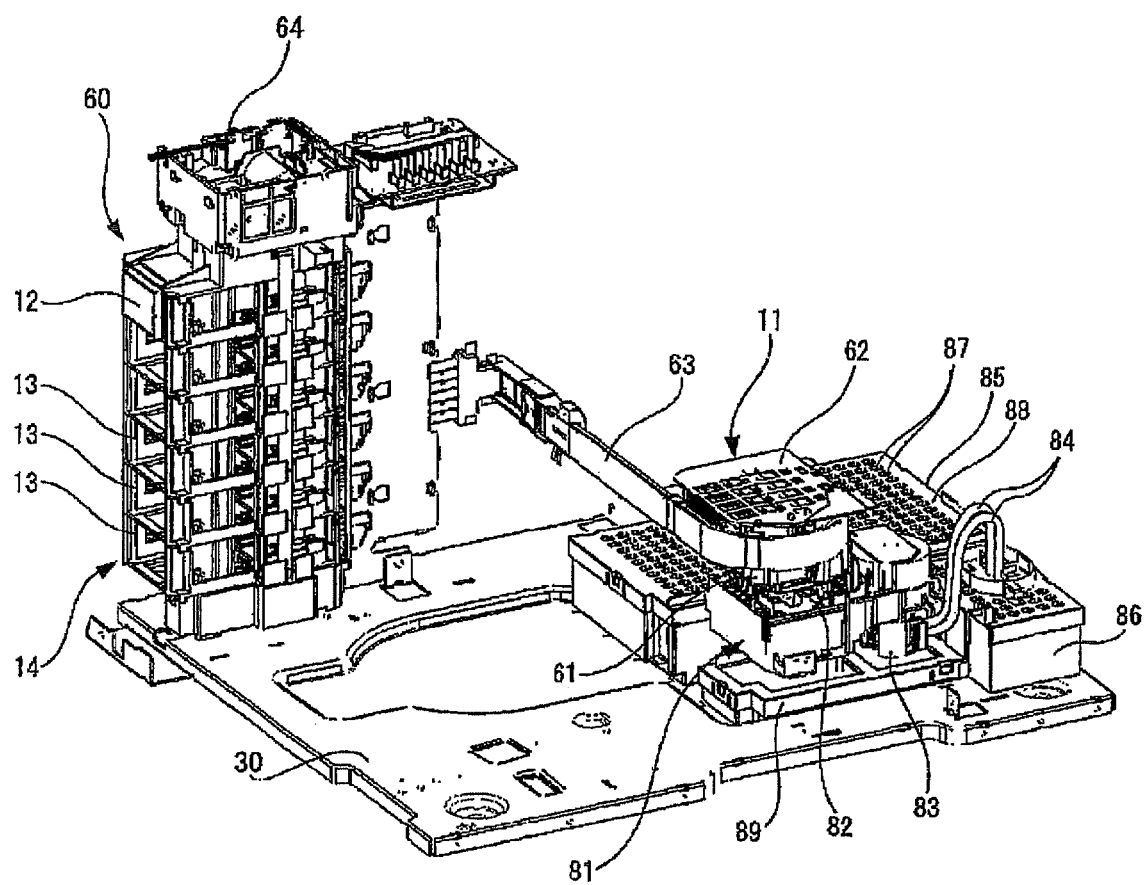
FIG. 4 is a perspective view illustrating a printer equipped with the publisher.

As shown in FIG. 4, the label printer 11 is provided with the carriage 62 that includes an ink-jet head 61 having nozzles (not shown) for ink ejection. The carriage 62 reciprocates in a horizontal direction along a carriage guide shaft (not shown) by a driving force of a carriage motor.

The label printer 11 is provided with the ink supply mechanism 60 that includes the cartridge mounting unit 14 in which the ink cartridges 12 are mounted. The ink supply mechanism 60, which has a longitudinal shape, is erected on the main body frame 30 of the publisher 1 to be arranged in the vertical direction. One end of a flexible ink supply tube 63 is connected to the ink supply mechanism 60 and the other end of the ink supply tube 63 is connected to the carriage 62.

Ink of each ink cartridge 12 mounted on the ink supply mechanism 60 is supplied to the carriage 62 through the ink supply tube 63. In addition, the ink is supplied to the ink-jet head 61 through a damper unit and a back-pressure adjusting unit (not shown) provided in the carriage 62 to be ejected from ink nozzles (not shown).

The ink supply mechanism 60 includes a pressurizing mechanism 64 in the upper portion. In addition, the pressurizing mechanism 64 pressurizes the inside of each ink cartridge 12 by sending compressed air to supply the ink stored in an ink pack of each ink cartridge 12.

A head maintenance mechanism 81 is provided below a home position (location shown in FIG. 4) of the carriage 62.

The head maintenance mechanism 81 includes a head cap 82 that covers the ink nozzles of the ink-jet head 61 exposed to the lower surface of the carriage 62 disposed at the home position; and a used ink sucking pump 83 that sucks the ink discharged to the head cap 82 by a head cleaning operation or an ink filling operation on the ink-jet head 61.

The ink sucked by the used ink sucking pump 83 of the head maintenance mechanism 81 is sent to a used ink absorbing tank 85 through a tube 84.

In the used ink sucking tank 85, an absorption material (not shown) is disposed within a case 86 and an upper surface of the used ink absorbing tank 85 is covered with a cover 88 having plural airing holes 87.

In the lower portion of the head maintenance mechanism 81, a used ink receiver 89 which is a part of the used ink absorbing tank 85 is provided so as to receive ink dropped from the head maintenance mechanism 81 and to absorb the dropped ink by the absorption material.

Figure 5:
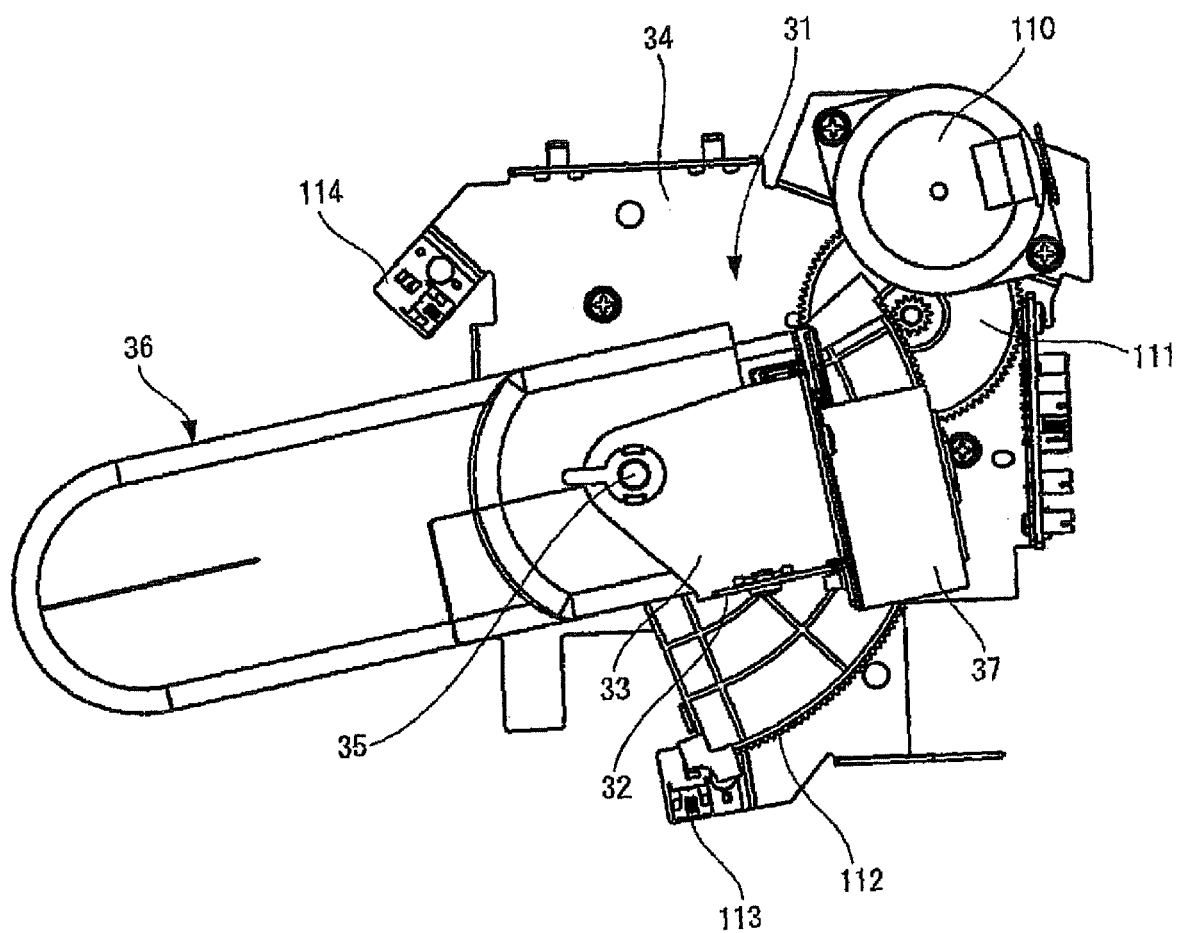
FIG. 5 is a plan view illustrating a transporting arm.

As shown in FIG. 5, below the chassis 32 forming the medium transporting mechanism 31, a fan-shaped toothed gear 112, to which a driving force of the driving motor 110 is delivered through a transfer toothed gear 111, is provided so as to be rotatable about the vertical guide shaft 35. With such a configuration, the transporting arm 36 rotates about the vertical guide shaft 35 by a rotational motion of the fan-shaped toothed gear 112 driven by the driving motor 110.

A lower-side horizontal support plate 34 is provided with an optical rotation HP detector 113 and a stacker location detector 114 which detect the ends of the outer edge of the fan-shaped toothed gear 112. The rotation HP detector 113 and the stacker location detector 114 detect the location of the transporting arm 36 in a horizontal plane.

Here, the rotation HP detector 113 detects whether in the horizontal plane, the transporting arm 36 is positioned at a location where the media M are granted and received with the media tray 41a of the media drive 41, a location where the media M are granted and received with the media tray 45 of the label printer 11, and a location where the media M is released in the stacker unit 71 (or the media stacker 72) of the drawing tray 70.

The stacker location detector 114 on the other side detects whether in the horizontal plane, the transporting arm 36 is positioned at a location where the media M are granted and received with the media stackers 21 and 22.

Figure 6:
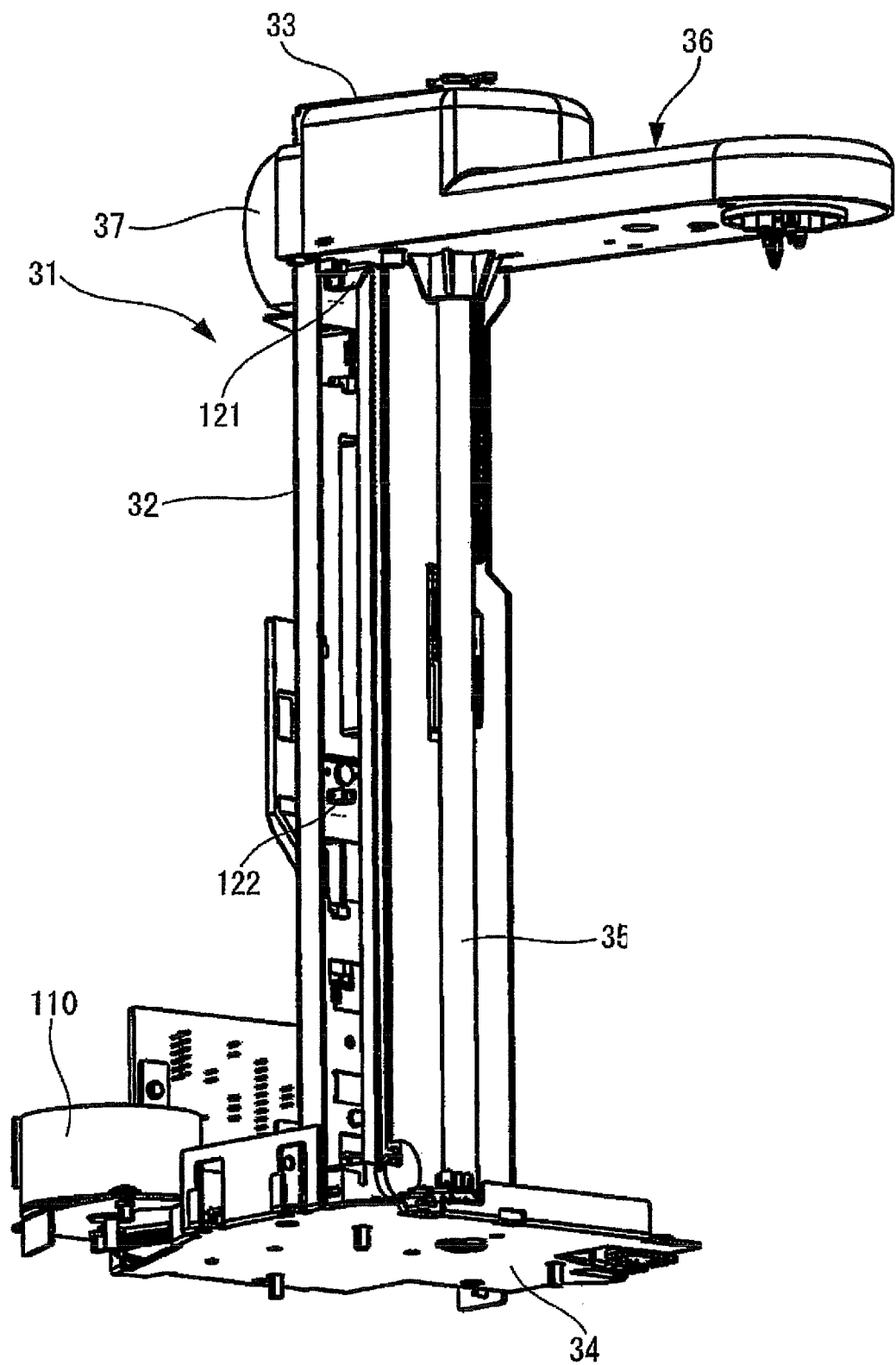
FIG. 6 is a perspective view illustrating the transporting arm.

As shown in FIG. 6, a vertical optical HP detector 121 and an intermediate optical location detector 122 are provided in the vicinity of an upper end and an intermediate portion of the chassis 32. The vertical HP detector 121 and the intermediate location detector 122 detect the location of the transporting arm 36 in a vertical direction.

The vertical HP detector 121 in the vicinity of the upper end detects whether the transporting arm 36 is positioned in the upper location of the media stacker 21. The intermediate location detector 122 detects whether the transporting arm 36 is positioned between the media stacker 21 and the media stacker 22.

Figure 7:
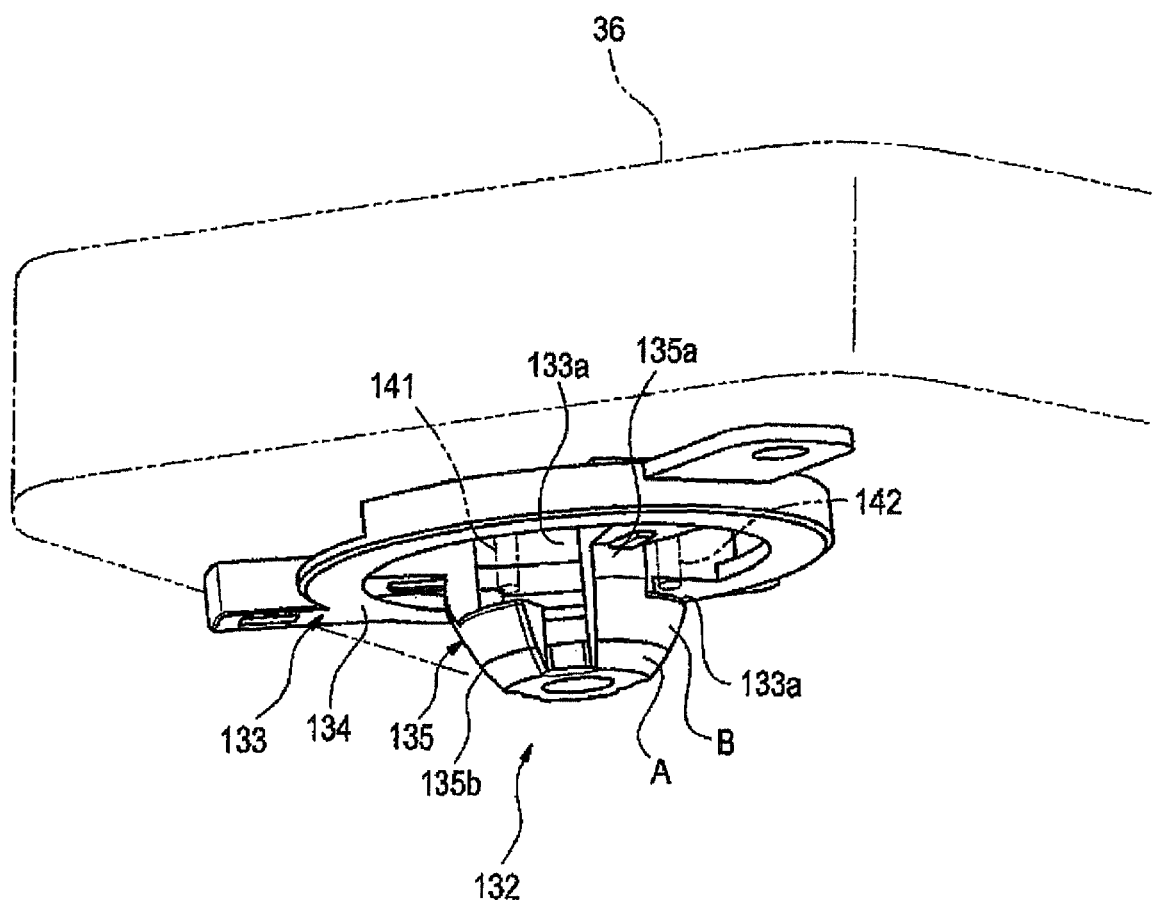
FIG. 7 is a perspective view illustrating the part of the transporting arm viewed from a lower side.
Figure 8:
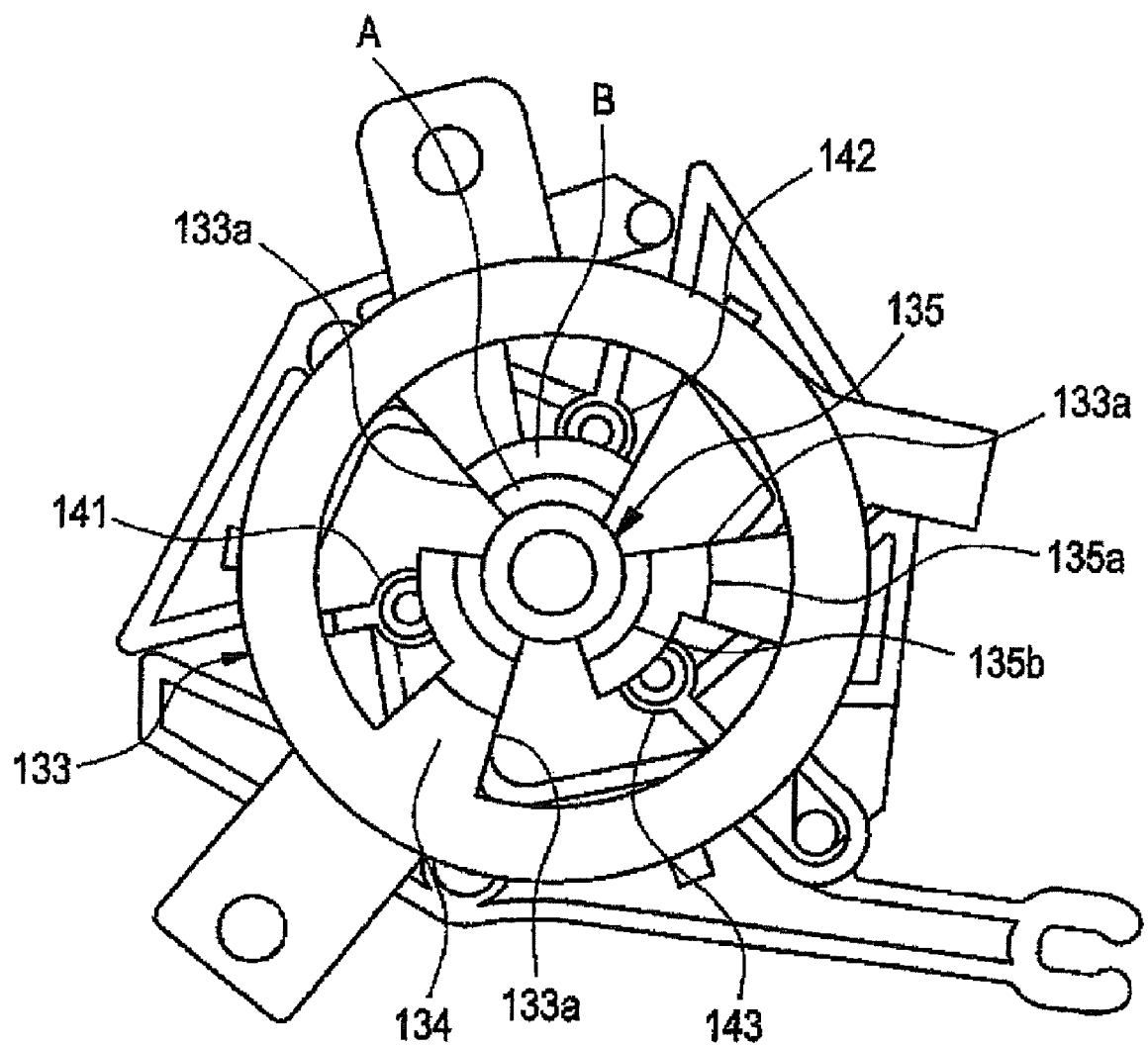
FIG. 8 is a back side view illustrating the part of the transporting arm.

As shown in FIGS. 7 to 9, a holder 132 is provided on a lower surface in the vicinity of a front end of the transporting arm 36 to hold the media M. The holder 132 is provided with a media guide 133.

Three window portions 133a are formed in the media guide 133. In addition, three holding members 141, 142, and 143 are configured to rise and set in a space within the window portions 133a.

The three holding members 141, 142, and 143 are inserted into a central hole Ma of each of the media M, expanded outward in a radial direction, protruded from the window portions 133a of the media guide 133, and brought into pressure contact with the inner circumferential surface of the central hole Ma of each of the media M to hold each of the media M.

The center of the media guide 133 is matched with a pickup center of the media M. In addition, the media guide 133 includes a guide portion 135 protruding downward in the center of a fixing plate 134 fixed to the lower surface of the transporting arm 36.

The guide portion 135 includes a circularly cylindrical base end portion 135a which has a diameter slightly smaller than the central hole Ma of the media M and a guide surface portion 135b which is formed in a substantially circular truncated cone shape, of which a diameter gradually narrows from the base end portion 135a downwards towards a front end side. The diameter of a front end of the guide portion 135 of the media guide 133 is configured to be inserted into the central hole Ma of each of the media M, even when an amount of location deviation of each of the media M received in the media stacker 21, the media stacker 22, and the stacker unit 71 (or media stacker 72) of the drawing tray 70 and a variation of a stop location of the transporting arm 36 are at a maximum.

Here, the guide surface portion 135b has a media positioning guide surface A and a media aligning guide surface B that are formed sequentially from a front end side. On the media positioning guide surface A, an inclined angle α with respect to an axis of the medium guide 133 is greater than an inclined angle β of the media aligning guide surface B with respect to the axis of the media guide 133. In this embodiment, the inclined angle α of the media positioning guide surface A with respect to the axis of the medium guide 133 is about 40 degrees and the inclined angle β of the media aligning guide surface B with respect to the axis of the media guide 133 is about 27 degrees. In addition, on the assumption that the thickness of the medium M is T, a height size Ha of the media positioning guide surface A is set to a thickness equal to or smaller than the thickness T and a height size Hb of the media aligning guide surface B is set to a thickness equal to or smaller than the thickness 2T of two media M.

Since the inner diameter of the media stacker 21, the media stacker 22, and the stacker unit 71 (or media stacker 72) of the drawing tray 70 is larger than the outer diameter of the media M, the media M are accommodated in a scattered manner in a planar direction.

An example in which the media M accommodated in the media stacker 21, the media stacker 22, and the stacker unit 71 (or media stacker 72) of the drawing tray 70 are received by the transporting arm 36 will be described with reference to FIGS. 10A to 10D.

When the transporting arm 36 moves down to receive the media M accommodated in the stacked manner, the medium guide 133 first approaches the media M and the front end of the medium guide 133 is inserted into the central hole Ma of a first medium of the media M, which is stacked in the uppermost position.

Figure 10A:
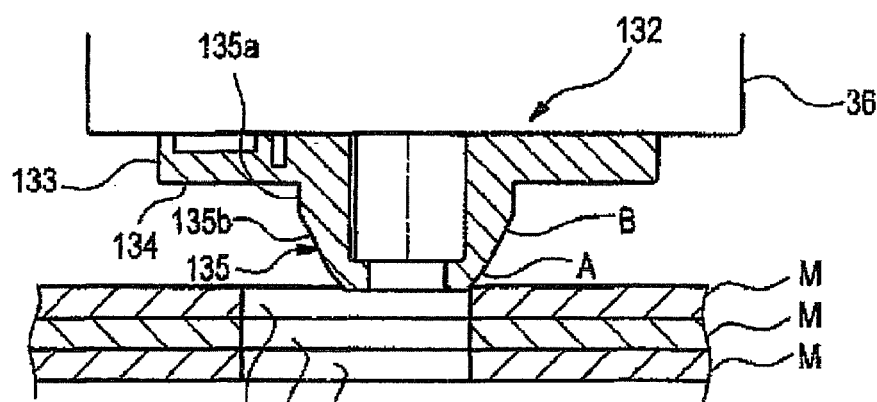
FIGS. 10A, 10B, 10C, and 10D are sectional views illustrating that the transporting arm receives a medium.

Subsequently, the medium positioning guide surface A in the guide surface portion 135b of the medium guide 133 is brought into contact with the central hole Ma of each of the media M, as shown in FIG. 10A.

Then, when the transporting arm 36 moves down, the first medium M is moved in the planar direction by the medium positioning guide surface A.

Here, since the medium positioning guide surface A has the greater inclined angle α with respect to the axis of the medium guide 133, the first medium M is moved in a planar direction with the downward movement of the transporting arm 36.

Figure 10B:
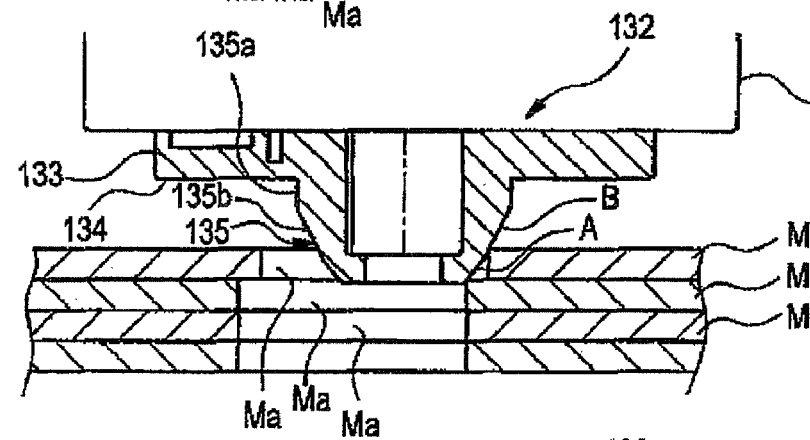

Subsequently, when the transporting arm 36 moves down, the medium aligning guide surface B is brought into contact with the central hole Ma of the first medium M and the medium positioning guide surface A is also brought into contact with the central hole Ma of a second medium M, as shown in FIG. 10B.

Then, when the transporting arm 36 moves down, the first medium M is moved in the planar direction by the medium aligning guide surface B and the second medium M is also moved in the planar direction by the medium positioning guide surface A.

Here, since the medium positioning guide surface A has the greater inclined angle α with respect to the axis of the medium guide 133, the second medium M is considerably moved by the medium positioning guide surface A with the downward movement of the transporting arm 36. However, since the medium aligning guide surface B has the inclined angle β smaller than inclined angle α of the medium positioning guide surface A with respect to the axis of the media guide 133, the first medium M is moved by a small movement amount in the planar direction to be aligned.

Figure 10C:
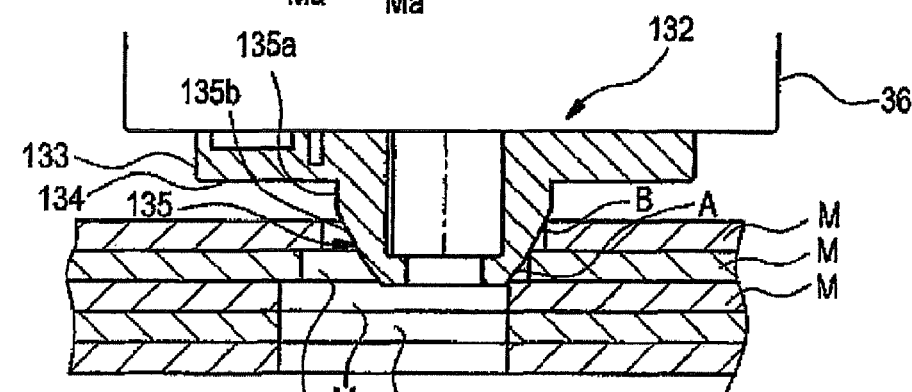

When the transporting arm 36 moves down, the medium aligning guide surface B is brought into contact with the central holes Ma of the first and second media M and the medium positioning guide surface A is brought into contact with the central hole Ma of a third medium M, as shown in FIG. 10C.

Then, with the downward movement of the transporting arm 36, the first and second media M are moved by a small movement amount in the planar direction by the medium aligning guide surface B, which has the inclined angle β smaller than the inclined angle α of the medium positioning guide surface A with respect to the axis of the medium guide 133, to be aligned. In addition, the third medium M is considerably moved by the medium positioning guide surface A having the greater inclined angle α with respect to the axis of the medium guide 133.

Figure 10D:
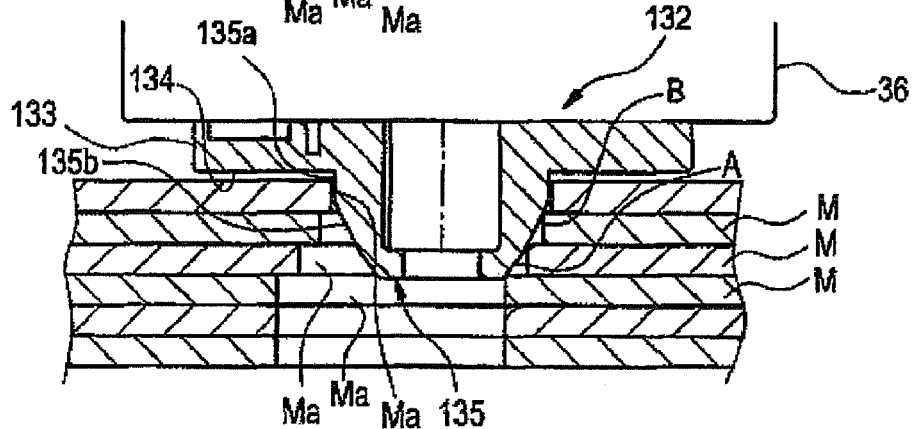

When the transporting arm 36 moves down, the circularly cylindrical base end portion 135a is inserted into the central hole Ma of the first medium M aligned by the medium aligning guide surface B, the medium aligning guide surface B is brought into contact with the central holes Ma of the second and third media M, and the medium positioning guides surface A is brought into contact with the central hole Ma of a fourth medium M, as shown in FIG. 10D.

Then, when the transporting arm 36 moves down, the second and third media M are moved by the small movement amount in the planar direction by the medium aligning guide surface B, which has the inclined angle β smaller than the inclined angle α of the medium positioning guide surface A with respect to the axis of the medium guide 133, to be aligned. In addition, the fourth medium M is considerably moved by the medium positioning guide surface A having the greater inclined angle α with respect to the axis of the medium guide 133.

Subsequently, when the three holding members 141, 142, and 143 are expanded outward in the radial direction, protruded from the window portions 133a of the medium guide 133, and brought into contact with the inner circumferential surface of the central hole Ma of the first medium M to hold the medium M, the transporting arm 36 moves up. In this way, the first medium M is received and transported by the transporting arm 36.

According to the medium transporting mechanism, as described above, the guide surface portion 135b of the medium guide 133 has the medium positioning guide surface A and the medium aligning guide surface B sequentially from the front end side, and the inclined angle α of the medium positioning guide surface A with respect to the axis of the medium guide 133 is greater than the inclined angle β of the medium aligning guide surface B with respect to the axis of the medium guide 133. With such a configuration, each of the media M is considerably moved in the planar direction by the medium positioning guide surface A having the greater inclined angle α with respect to the axis of the medium guide 133 and then each of the media M is able to be exactly aligned in the planar direction by the medium aligning guide surface B having the smaller inclined angle β with respect to the medium guide 133. In this way, it is possible to position the media M satisfactorily, while minimizing protrusion of the medium guide 133.

That is, it is possible to minimize an increase in the size of the medium transporting mechanism, achieve good mobility, and position the stacked media M easily and smoothly.

Since the height size Ha of the media positioning guide surface A is set to the thickness equal to or smaller than the thickness T of each of the media M, the number of the media M being brought into contact with the medium positioning guide surface A where a load for moving the media M increases is able to be set to one. With such a configuration, it is possible to smoothly position the media M.

The height size Hb of the medium aligning guides surface B may be set to the thickness equal to or smaller than the thickness 2T of two media M. Advantages obtained from this configuration will be described below with reference to FIGS. 11 to 14.

As shown in FIGS. 10A to 10D, when the stacked media M are deviated toward one side with respect to the axis of the medium guide 133, a movement direction of the first medium M is the same as a movement direction of the second medium M. Likewise, the movement direction of the second medium M is the same as a movement direction of the third medium M. Accordingly, the second medium M may be moved in the same planar direction, when the medium positioning guide surface A is brought into contact with the central hole Ma of the first medium M and the first medium M is moved in the planar direction and a frictional force or a contact force occurs between the first medium M and the second medium M, as shown in FIG. 10A. Subsequently, for the same reason as above, the third medium M may be moved in the same planar direction, when the medium aligning guide surface B is brought into contact with the central hole Ma of the first medium M, the medium positioning guide surface a is brought into contact to the central hole Ma of the second medium M, and the first and second media M are moved in the planar direction, as shown in FIG. 10B. Accordingly, when the stacked media M are deviated toward one side with respect to the axis of the medium guide 133, the frictional force or the contact force exerted between the adjacent media M does not hinder the movement of the media M in the planar direction.

Figure 11:
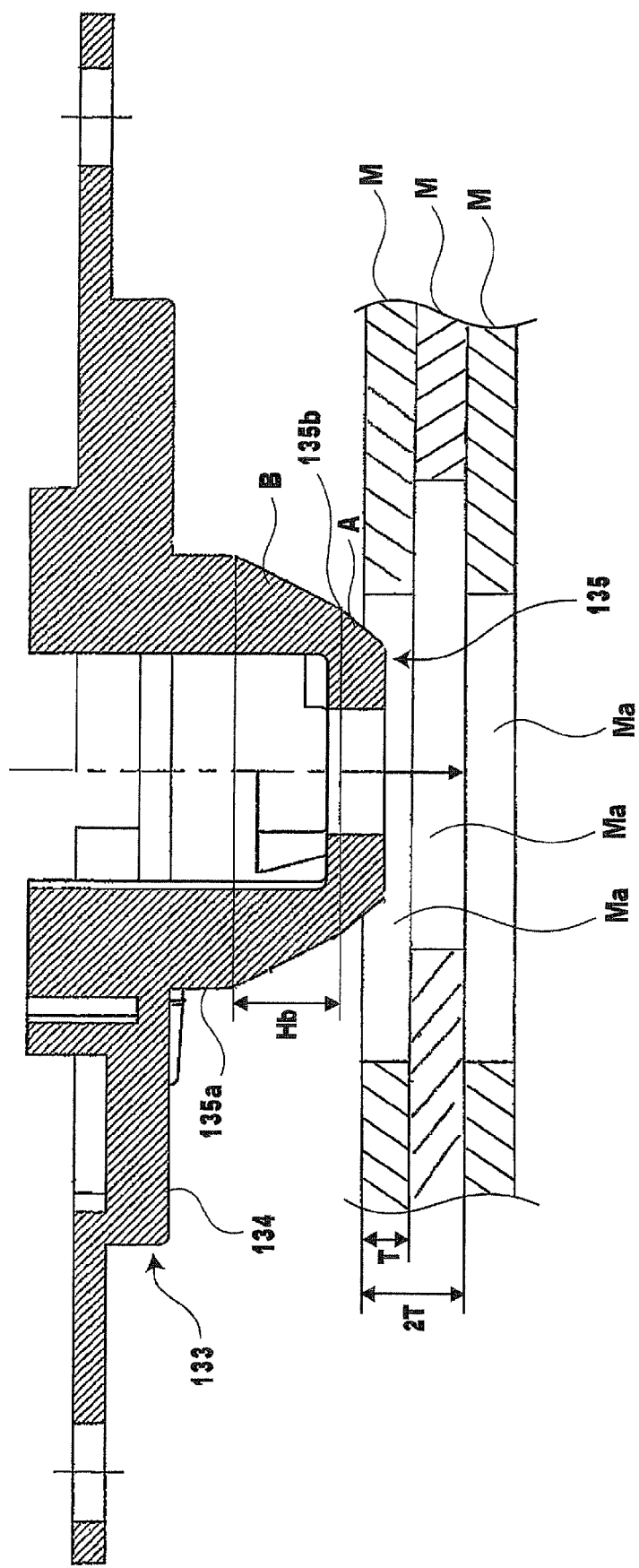
FIGS. 11, 12, 13, and 14 are sectional views illustrating that the transporting arm receives the medium.
Figure 12:
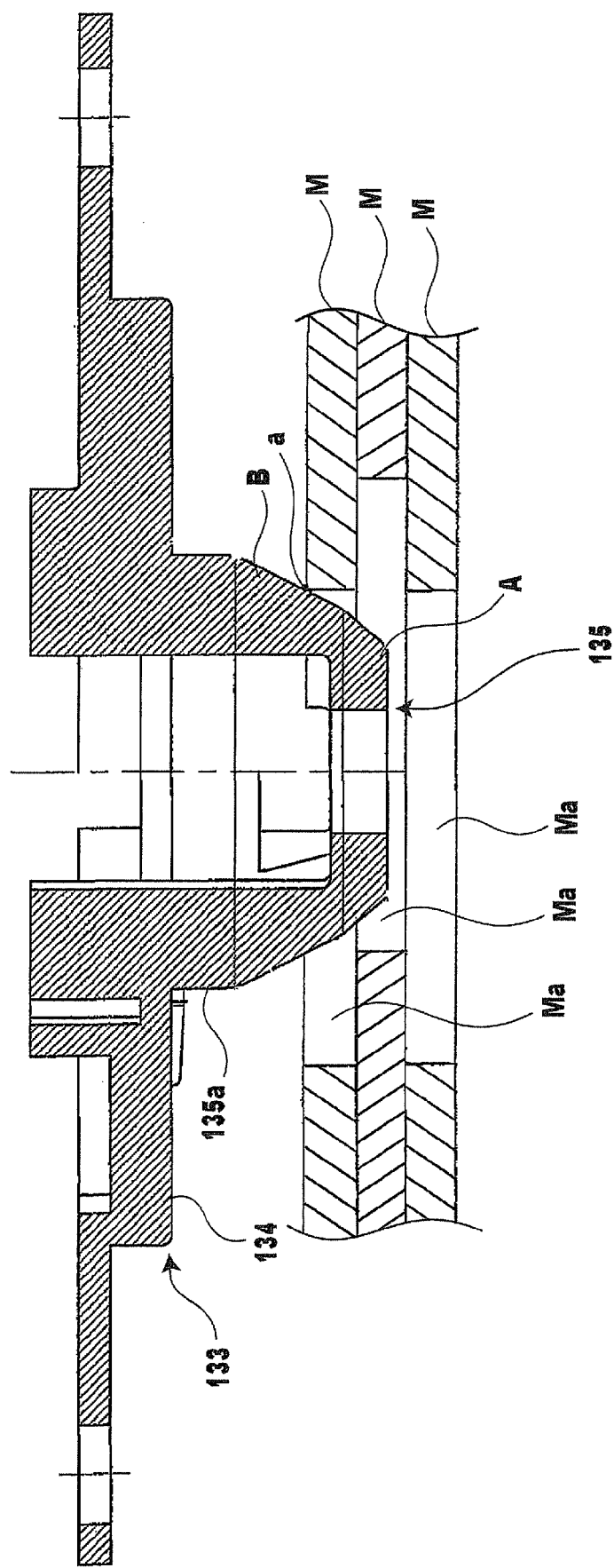

On the other hand, when the stacked media M are deviated toward both sides with respect to the axis of the medium guide 133, the movement direction of the first medium M opposes the movement direction of the second medium M, as shown in FIG. 11. Likewise, the movement direction of the second medium M opposes the movement direction of the third medium M. When the transporting arm 36 moves down, the medium aligning guide surface B is brought into contact with a point a of the central hole Ma of the first medium M, as shown in FIG. 12. Then, the first medium M is moved right in the planar direction by the medium aligning guide surface B with the downward movement of the transporting arm 36.

Figure 13:
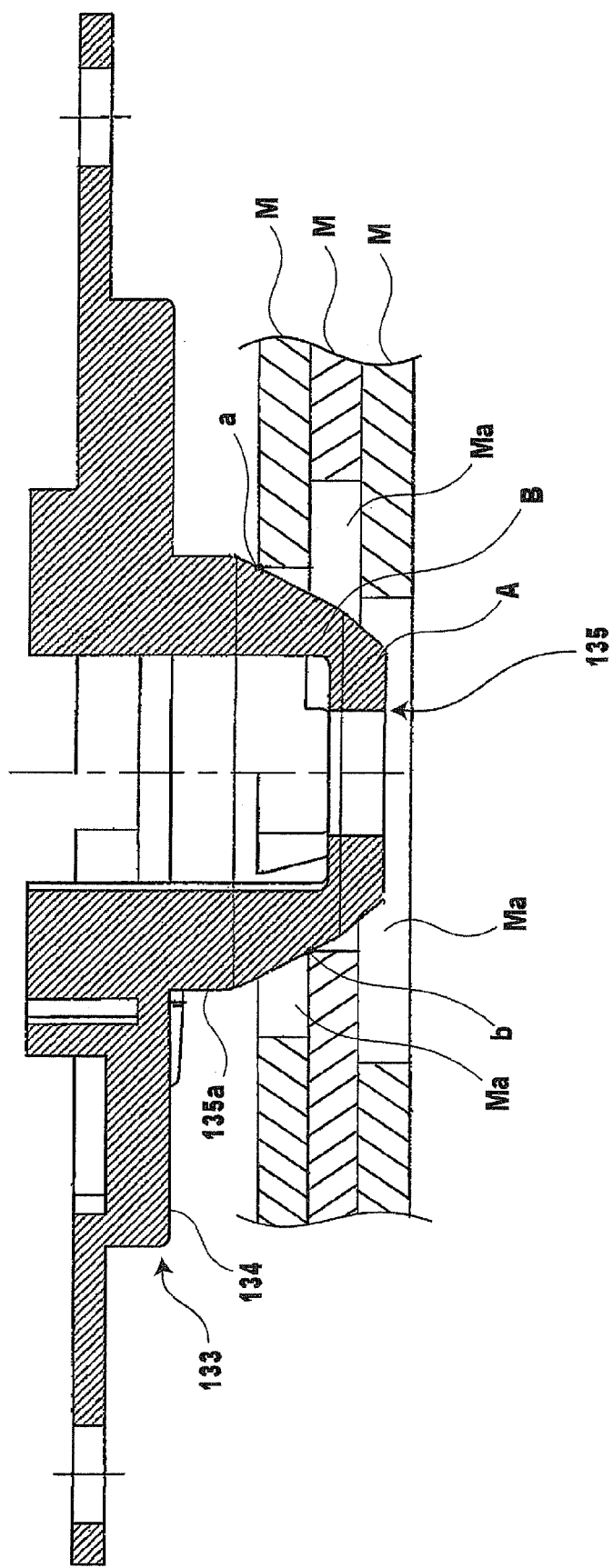

Subsequently, when the transporting arm 36 moves down, the medium aligning guide surface B is brought into contact with the central hole Ma of the first medium M and also brought into contact with a point b of the central hole Ma of the second medium M, as shown in FIG. 13. Then, the first medium M is moved right in the planar direction by the medium aligning guide surface B with the downward movement of the transporting arm 36 and the second medium M is moved left in the planar direction by the medium aligning guide surface B. At this time, a force applied from the medium aligning guide surface B to the point a is distributed into a force pressing the first medium M right in the planar direction and a force pressing the first medium M in a downward direction. The force pressing the first medium M from the upward side causes an increase in the frictional force or the contact force exerted between the first medium M and the second medium M. Moreover, the frictional force or the contact force caused in this manner and a force pressing the first media M right in the planar direction generate a force moving the second medium M right in the planar direction. This force hinders the second medium M from being moved left in the planar direction. The same relation is established between the second medium M and the third medium M. When the stacked media M are deviated toward the both sides with respect to the axis of the medium guide 133, the frictional force or the contact force exerted between the adjacent media M hinders the media M from being moved in the planar direction.

Figure 14:
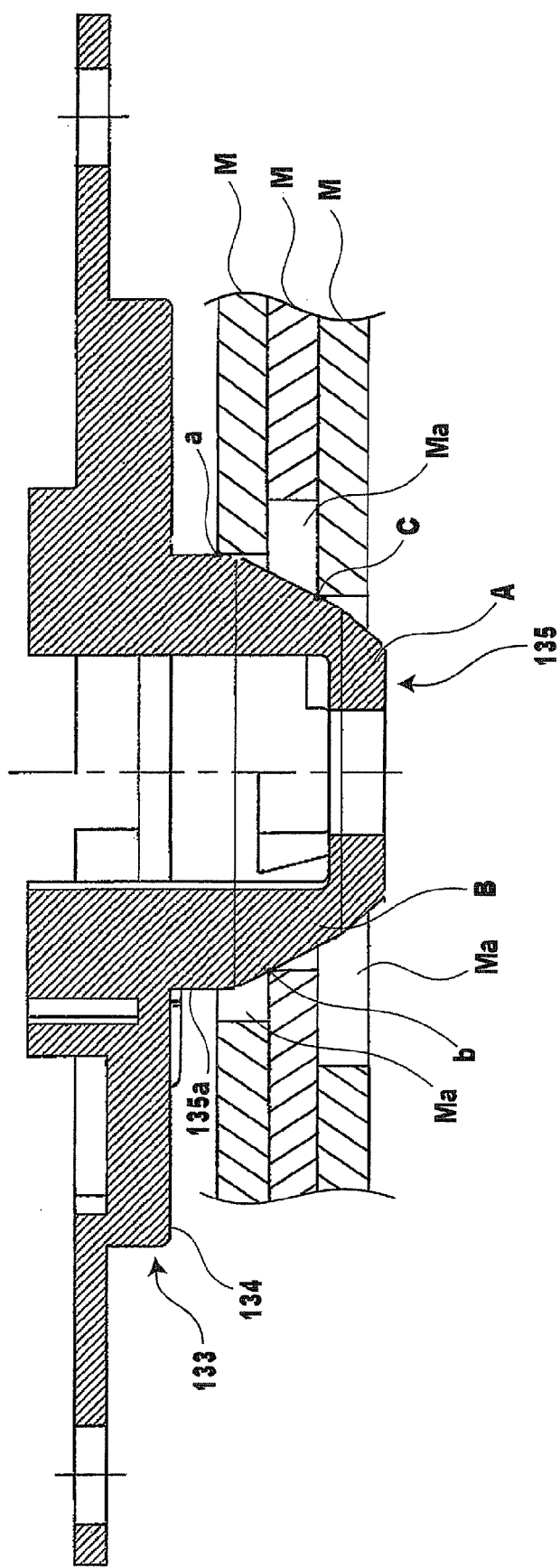

When the transporting arm 36 further moves down, the medium aligning guide surface B is brought into contact with a point c of the central hole Ma of the third medium M, as shown in FIG. 14. At this time, when the height size Hb of the medium aligning guide surface B is set to the thickness equal to or smaller than the thickness 2T of two media M, the cylindrical base end portion 135a is inserted into the central hole Ma of the first medium M aligned by the medium aligning guide surface B. Therefore, the force applied from the medium aligning guide surface B to the point a become zero, the force hindering the second medium M from being moved left in the planar direction is decreased. Moreover, the force hindering the third medium M from being moved right in the planar direction is decreased. When the height size Hb of the medium aligning guide surface B is set to the thickness equal to or smaller than the thickness 2T of two media M, three media M are not simultaneously brought into contact with the medium aligning guide surface B. Accordingly, since the force hindering the second and third media M from being moved in the planar direction can be suppressed, it is possible to smoothly position the medium M.

As described above, the inner diameters of the media stacker 21, the media stacker 22, and the stacker unit 71 (or media stacker 72) of the drawing tray 70 are larger than the outer diameter of the media M, the media M are accommodated in such a manner that the media M are scattered in the planar direction. However, even though the plurality of media M are accommodated in such a manner that the media M are scattered at most in the planar direction, the inner diameters of the media stacker 21, the media stacker 22, and the stacker unit 71 (or media stacker 72) of the drawing tray 70, the size of the medium guide 133, and the inclined angle of the medium aligning guide surface B are set so that the medium aligning guide surface B of the medium guide 133 may be brought into contact with the central holes Ma of all the stacked media M.

According to the publisher equipped with the medium transporting mechanism, there is provided the medium transporting mechanism 31 capable of surely positioning and holding the media M. Accordingly, it is possible to realize the medium processing apparatus with high processing reliability.

In the above-described embodiment, the medium guide 133 has the substantially circular truncated cone shape, of which the diameter gradually narrows from the base end portion 135a downward towards the front end side. However, the medium guide 133 may be formed in a substantially circular cone shape. The medium guide 133 functions as positioning the media M, as long as the medium guide 133 has the tapered surface (the guide surface portion 135b) inclined with respect to the axis of the medium guide 133. That is, when the medium guide 133 is inserted into the central hole Ma of each of the media M, the tapered surface is brought into contact with the inner surface of the central hole Ma of the media M and the respective centers of the media M are positioned with respect to the axis of the medium guide 133. In this case, in order to make the protrusion of the medium guide 133 small, it is preferable that the medium guide 133 is formed in the substantially circular truncated cone shape.

In the above-descried embodiment, the central holes Ma of the media M may be formed at locations other than the centers of the media M. The central holes Ma of the media M may be formed in any shape other than a circle. The three holding members 141, 142, and 143 are configured to be inserted into the central holes Ma of the media M to be brought into contact with the inner circumferential surface of the central holes Ma of the media M. However, the three holding members 141, 142, and 143 may be configured to hold the outer circumferential surface of the media M.

The media to be used are not limited to the disc-shaped media such as the media M described in the embodiment, but may be applied to media having a polygonal shape such as a rectangular shape or an elliptic shape. Moreover, the recording method is not limited to an optical recoding method or a magneto-optical recoding method.

The medium transporting mechanism of the present invention is configured to be able to transport various types of media that have different thicknesses. In such a case, the height size Ha of the media positioning guide surface A is set so as to be equal to or smaller than a thickness T of one of the media, the type of which has a minimum thickness. Further, the height size Hb of the medium aligning guide surface B is set so as to be equal to or smaller than a thickness 2T of two of the media, the type of which has a minimum thickness.

What is claimed is:

1. A medium transporting mechanism for transporting one of stacked media each of which has a hole, the medium transporting mechanism comprising:
   a movable transporting arm;
   a holder provided on the transporting arm and holding the one of the media; and
   a guide provided in the transporting arm, the guide having a tapered surface that is inclined with respect to an axis of the guide,
   wherein the tapered surface is configured to be brought into contact with an inner surface of the hole of the one of the media when the guide is inserted into the hole of the one of the media;
   wherein the tapered surface includes a first surface on a tip end portion of the guide and a second surface on a base end portion of the guide; and
   wherein an inclined angle of the first surface with respect to the axis of the guide is greater than an inclined angle of the second surface with respect to the axis of the guide.

2. The medium transporting mechanism of claim 1, wherein a dimension of the first surface in a direction parallel to the axis of the guide is equal to or smaller than a thickness of the one of the stacked media.

3. The medium transporting mechanism of claim 1, wherein a dimension of the second surface in a direction parallel to the axis of the guide is equal to or smaller than a thickness of two of the stacked media.

4. The medium transporting mechanism of claim 1, wherein the holder is configured to be brought into contact with the inner surface of the hole to hold the one of the media.

5. The medium transporting mechanism of claim 1, wherein the holder includes a plurality of holding members.

6. The medium transporting mechanism of claim 1, wherein the guide is formed into a circular truncated cone shape having a diameter that gradually narrows from the base end portion thereof toward a tip end portion of the guide.

7. The medium transporting mechanism of claim 1, wherein the guide is formed into a circular cone shape having a diameter that gradually narrows from the base end portion to the tip end portion of the guide.

8. The medium transporting mechanism of claim 1, further comprising a stacker that accommodates the media in a stacked manner.

9. The medium transporting mechanism of claim 1, wherein the guide is inserted into the hole of the one of the media when the transporting arm is moved down.

10. A medium processing apparatus comprising:
    a processor operable to at least one of read data from, write data on, and execute printing on the medium; and
    the medium transporting mechanism of claim 1, wherein the medium transporting mechanism transports the one of the stacked media to the processor.

11. The medium transporting mechanism of claim 1, wherein the inclined angle of the first surface is about 40 degrees and the inclined angle of the second surface is about 27 degrees.

* * * * *